(12) United States Patent
Babulski

(10) Patent No.: US 6,778,295 B1
(45) Date of Patent: Aug. 17, 2004

(54) COMPOSITE THREE-DIMENSIONAL IMAGE DISPLAY AND METHOD OF PREPARING SAME FROM COLOR PHOTOGRAPHS AND LCD DISPLAYS

(75) Inventor: David J. Babulski, Snellville, GA (US)

(73) Assignee: Lanier Worldwide, Inc., Atlanta, GA (US)

( * ) Notice: Subject to any disclaimer, the term of this patent is extended or adjusted under 35 U.S.C. 154(b) by 0 days.

(21) Appl. No.: 09/491,369

(22) Filed: Jan. 26, 2000

(51) Int. Cl.$^7$ .............................................. G06K 15/00
(52) U.S. Cl. ........................................ 358/1.9; 358/1.1
(58) Field of Search ........................... 358/1.1, 1.4, 1.6, 358/1.9, 1.18; 350/462, 463, 464, 465

(56) References Cited

U.S. PATENT DOCUMENTS

| | | |
|---|---|---|
| 4,421,380 A | 12/1983 | McGrew |
| 5,396,559 A | 3/1995 | McGrew |
| 5,398,131 A * | 3/1995 | Hall et al. .................. 359/465 |

OTHER PUBLICATIONS

"The Subaru Telescope in Stereo," Nov. 1998, FARSTAR—Proof of 3D concept, subaru, astronomy, telescope, ngc 2997; pp. 1–43, www.cliffr.com/galaxies/3d–real–htm.

"Stereoscopic Displays and Virtual Reality Systems V (1998)"; Proceedings of the two conferences; pp. 1–5, www.stereoscopic.org/1998/preface.html.

Stereo–Vision Formats For Video And Computer Graphics, 1996–97, Lenny Lipton, pp. 1–8, www.sterographics.com/html/body_stereo_formats.html.

"Stereoscopic Imaging Technology," Apr. 27, 2000, Michael Starks, pp. 1–20, www.3dmagic.com/articles/sit.html.

"Direct View Holographic Autostereoscopic Displays," David Trayner MA; Edwina Orr MA, Reality Vision Ltd., pp. 1–8, www.brunel.ac.uk/depts/mesR... vr.

"Enter the Third Dimension," ZD Net PC Magazine, Dec. 14, 1999, pp. 1–5, www.zdnet.com/pcmag/stories/reviews/0,6755,2406495,00.html.

"CMS Introduces Dimensional Imaging A New 3d Presentation Technology," pp. 1–3, www.prweb.com/releases/1997/prweb 1461.htm.

"Arts & Leisure: Holograms of a Different Stripe," Austin Chronicle Aug. 10, 1998, May 19, 2000, pp. 1–4, http://desert.net/ww/Aug. 10, 1998/austin_screens_feature1.html.

"Light Constructions," OE Reports 164–Aug. 1997, pp. 1–3, www.spie.org/web/ore/aug./aug97/ltconstr.html.

"Konica Lessons In Color Photography," 1996, pp. 1–2, www.konica.co.jp/english/color/color2.html.

"Stereogram FAQ," Stuart Inglis, Aug. 28, 1999, pp. 1–20, www.cswaikato.ac nz/~singiis/stras/general.html (see included dated material).

"A11P95:38: Seminar On Industrial Virtual Reality Concepts & Technology," 1995, pp. 2–12, www.aup.org/public/aup.reports.95/aups95/38 html.

(List continued on next page.)

Primary Examiner—Arthur G. Evans
(74) Attorney, Agent, or Firm—Sutherland Asbill & Brennan LLP

(57) ABSTRACT

A technology for creating a three-dimensional effect in viewing photographs and moving images. The image display produced has a three-dimensional effect, prepared from a color analog or digital photograph, or from a digital display screen showing moving image. Each display superimposes color raster-pixel representations of the same field of view to create the 3D effect. In one embodiment, a color print is photocopied onto paper and again onto a transparency, and the photocopies are spaced apart by plastic films. For viewing, the assembled photocopies are back lit and front lit.

38 Claims, 4 Drawing Sheets

OTHER PUBLICATIONS

"Int Symp 3D Image Technology & Arts," Tokyo 5–7 Feb., 1992, pp. 1–20, www.aup.or.jp/public/aup.reports.92/3a–2–92.2html.

"SPIE Web, Optical Engineering Press," SPIE vol. MS 130, Aug. 30, 1999, pp. 1–7, www.spie.org/web/astracts/oepress/MS 130.html.

"3D Vision Without Special Eye Glasses," May 18, 2000, pp. 1–2, www.infowin.org/ACTS/IENM/newsclips/arch1998/980604de.htm.

"Special Item: Introduction—Auto–Stereoscopic 3D–LCD," Philips Research: What is 3D–LCD, May 19, 2000, one page, www.research.philips.com/generalinfo/special/3dlcd/tech/gen/preamble.htm.

"Autostereoscopic Displays—3D Capable Computer Monitors and 3DTV," The Two Three's—3D Displays, May 19, 2000, pp. 1–4, www.cuni.cz/~pavlik/skola/3d/autosteroscopy/rhs/htm.

"Duth Holographic Laboratory," Walter Spierings/Ana Barreto, Leonardo vol. 28, No. 4, pp. 273–280, 1995, pp. 1–14, www. holoprint.com/articles/leonardo/leonardo.html.

"CFC Hologram Fundamentals," CFC Applied Holographics: Hologram Fundamentals; May 18, 2000, pp. 1–5, www.jetlinK.net/~cfcah/holobkgd.htm.

Symposium abstracts, Aug. 28, 1999, 7 pages, www.spie.org/web/abstracts/2400/2409.html.

"The Creation of An Infrastructure For Electro–Stereoscopic Displays," 1992, 1 page, www.aup.or.jp/public/aup.reports92/3a—2–92.2.html.

"Practical Holography," A Guide to Practical Holography, Christopher Hamersveld, 1995–99, pp. 1–13, www.noto.com/noto/book/book1.htm#ascon.

"Bibliography of Stereoscopy," Aug. 30, 1999, pp. 1–5, http://userwww.stsu.equ/~ni/3D/biblio.html.

"Sony Unveils Instant Holographic Portait Printing Systems," Alan Rhody, Sep. 21, 1999, 18 pages, www.connix.com/paretoo/history/htm (Part 1997).

"Amateur Holography—Simle & Low Budget," Amateur Holography, Jun. 1999, pp. 1–11, http://members.aol.com/gakall/holopg.html.

"Spatial Imaging Group, Rendering for Multiperspective Spatial Displays," The 3D Displays Page, May 18, 2000, 1 page, www.media.mit.edu/groups/spi/new_Render.html.

"MIT Media Laboratory Projects," Spatial Imaging—Stephen Benton, May 18, 2000, pp. 1 and 2, www.media.mit.edu/Projects/benton.html.

"Principle of Integral Photography," May 18, 2000, pp. 1 and 2, www.strl.nhk.or.jp/open99/ki–5;/detail–e.html.

"AutoStereoscopic Display System," Phil Harman, Xenotech Research Pty Ltd., 56 I SPIE vol. 2653, 9 pages 0–8194–2027–1/96.

"Passive Autostereoscopic Light Field Displays," Aaron Isaksen and Leonard McMilan, May 18, 2000, 2 pages, www.graphics.lcs.mit.edu/~aisaksen/projects/autostereoscopic/.

* cited by examiner

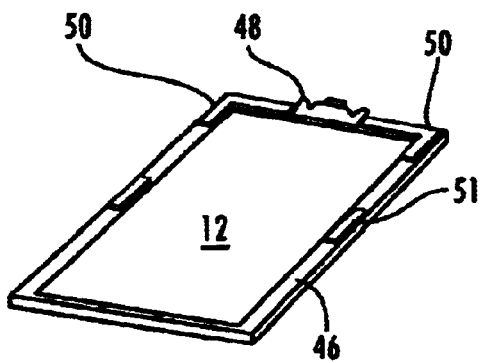
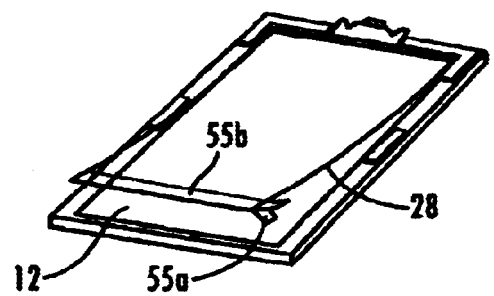
Fig. 5A   Fig. 5B
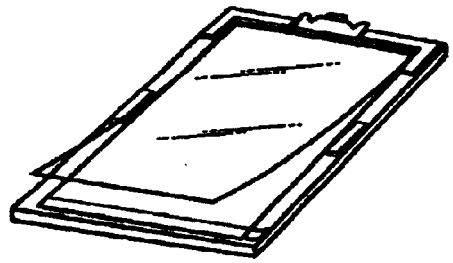
Fig. 5C
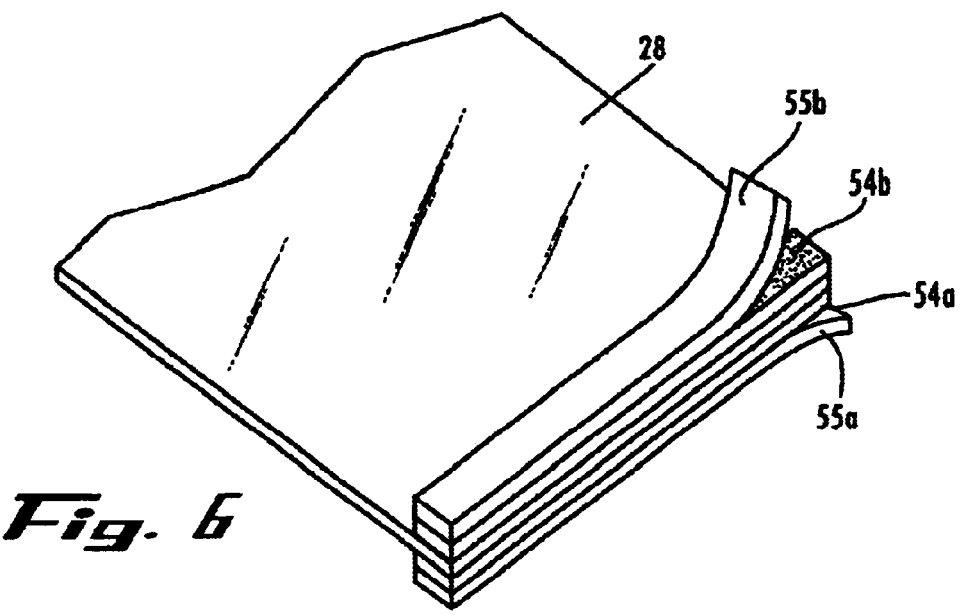
Fig. 6

COMPOSITE THREE-DIMENSIONAL IMAGE DISPLAY AND METHOD OF PREPARING SAME FROM COLOR PHOTOGRAPHS AND LCD DISPLAYS

TECHNICAL FIELD

The present invention relates to an image display prepared from a color photograph or LCD display so as to present a three-dimensional effect to the observer. The invention also relates to a method for enhancing the display of certain color photocopies.

BACKGROUND ART

Paralleling the development and acceptance of photography has been a desire to present images that appear lifelike, that is, three-dimensional. Various techniques have been conceived for creating a three-dimensional (3D) effect. Stereograms were produced by taking two photographs of the same field of view from the perspective of separate human eyes, and then displaying them separately to the eyes of the observer using a special apparatus. Holograms display impressive three-dimensional images, but a laser must be used to create the hologram.

Three-dimensional effects in motion pictures and television have also relied on complex techniques for recording and viewing the subject. The audience must wear special glasses to "decode" the special images and trick the brain into "seeing" three dimensions.

Photographic prints taken with a single lens camera present a two-dimensional image. It has been generally believed that one cannot make a hologram from a photographic print. Some contrast enhancement of black and white photographs has been obtained using the well-known process of unsharp masking, but no process is known for displaying normal color photographic prints (traditional or digital) with a three-dimensional effect. Nor is there a known process for displaying digital photographs with a three-dimensional effect.

In some commercial sales efforts, salespersons provide color photocopies of photographs to potential customers. For example, real estate agents often use color photocopies to show properties to prospects. However, non-enhanced color photocopies may not be as lifelike as the salesperson desires.

Thus, there is a need for a straightforward, inexpensive process for creating a three-dimensional effect in viewing photographs and moving images, and a further need for enhancing color photocopies of photographs.

SUMMARY OF THE INVENTION

The present invention seeks to provide an image display with a three-dimensional effect, prepared from a color analog or digital photograph, or from a digital display screen.

This object is achieved in the present invention by superimposing color raster-pixel representations of the same field of view.

Generally described, the present invention provides an image display, comprising: a first color raster-pixel representation of a three-dimensional field of view, including depth information, presented on a two-dimensional base medium; and a second color raster-pixel representation of the three-dimensional field of view, including depth information, presented on a two-dimensional transparent cover medium; and being held in spaced apart, aligned relation to one another. A person looking at the image display from the side of the second representation perceives a three-dimensional effect.

Such an image display may be prepared, according to one embodiment of the invention, from a color photographic print, by making a color photocopy of the print on translucent paper, and then making another photocopy of the print on a transparency. The two photocopies are assembled so that the raster-pixel representations are aligned and spaced from one another. Alternatively, the image display may be prepared, according to another embodiment of the invention, from a color digital photograph. The image file is printed first on paper, and then on a transparency, using a color photocopier or a color laser printer. The representations differ in at least one optical characteristic, which may result, for example, from differences in the media on which they are presented or different parameters used in their creation.

In both of the foregoing embodiments, the two representations preferably are spaced from about 0.03 to about 0.07 inch. This spacing may be provided by the thickness of the transparency or by one or more spacers, preferably a layer of Lexan plastic and two layers of Mylar plastic between the Lexan and the paper photocopy. The three-dimensional effect is maximized by simultaneously back-lighting the paper photocopy to pass light through the translucent paper base medium and front lighting to direct light through the transparent cover medium while also illuminating the transparency.

In still another embodiment of the invention, an image display with a three-dimensional effect is prepared by superimposing two LCD displays of the same field of view. This embodiment provides three-dimensional moving images.

The present invention also provides a method of preparing an image display, comprising: inputting to a laser printing device a color image including depth information; printing a first raster-pixel representation of the color image on a base medium; printing a second raster-pixel representation of the color image on a transparent cover medium; aligning the representations and mounting them in spaced apart relation. The laser printing device may be, for example, a color photocopier or a color laser printer. In one embodiment, the inputting step comprises mounting a color photographic print in a frame including registration indicia, and exposing the mounted print in a color photocopier, such that the registration indicia appear on both of the representations; and wherein the aligning step comprises aligning the registration indicia. In another embodiment, the inputting step comprises sending a file containing a digital photographic image to a color laser printer or photocopier.

Output from color digital cameras produces a somewhat more enhanced 3D effect than that produced from color print analog cameras. This is believed due to a "pixel multiplication effect" when the color digital camera output is processed by the analog to digital color copier. Holographic phase data is believed to be recovered and displayed via raster/pixel refraction. Pixel multiplication recovers and displays more of the phase data encoded in the photographed image. A drawback to the digital camera is a slight grain to the image due to pixel multiplication.

It will therefore be understood that the present invention provides an improved method for displaying color photocopies of photographs.

Color photographic prints, unlike black and white prints, have multiple layers of photographic emulsions to record the three complementary colors that combine to represent the colors in the field of view. In one of its aspects, the present invention relates to the extraction, magnification and display of optical intensity and holographic phase data from a conventional color photograph with a color analog to digital color copying device to create the visual sensation of a 3D image to a human observer. It is believed that holographic phase and optical intensity data recovery, multiplication, and display are accomplished by optical interaction with raster and pixel patterns at the discontinuity between a translucent and transparent full color raster/pixel format copy of the original color photograph. The translucent and transparent copies of the color photograph are optically slightly dissimilar from each other, as produced by an analog to digital color copying device. The 3D image generated by this effect has characteristics of both a color hologram and a color auto stereogram and is believed to represent a hybrid between these two types of 3D images. The 3D image created by this effect has the characteristic of being sensed immediately by an observer and then gaining in strength as the observer gazes at the image. Most observers report that maximum 3D effect is reached after the observer's brain has fully assimilated the 3D image, a process taking about 60 seconds.

Referring in more detail to creating 3D effect image displays from color photographs, the first copy of the color photograph is rendered by an analog to digital color copying device in four color raster/pixel format on translucent paper with maximum sharpness and contrast and exposure set at mid level intensity. Specific analog to digital color copying devices may require additional special settings unique to that device. This first copy is called the base element. The second copy of the color photograph is rendered by the same analog to digital color copying device in four color raster pixel format on a transparent medium with minimum sharpness, contrast and with the exposure set at maximum light intensity. This second, transparent copy, is called the cover element. The cover element is placed over the front surface of the base element and, after alignment to null out moire interference patterns created by the interacting raster/pixel patterns, is physically locked into place. The cover element is then separated from the base element, in a direction perpendicular to the front surface of the base element, by multiple layers of transparent material, preferably with a thickness of 0.005 to 0.010 inches, and a refractive index slightly different from that of the transparent cover element. These layers are termed separation elements or spacers. Slight air gaps may be allowed to exist between the cover element and the top separation element, between separation elements and between the bottom separation element and the base element. The total separation between the base element and the cover element preferably is held to between 0.005 to 0.070 inches. The actual separation distance may be adjusted for maximum 3D effect.

White light, at a color temperature of 5000 degrees Kelvin, projected through the translucent base element of the assembled image display and incident white light passing through the cover element to reflect from the surface of the base element, optically interact with the two sets of color raster and pixel patterns; they also optically interact with the discontinuities between the base and cover elements and with the discontinuities between the separation elements to create intensity and phase interference patterns. These interference patterns are believed to represent the extracted and magnified holographic phase data and intensity data that is encoded within the color photograph. Light refracted and scattered by these intensity and phase interference patterns over the entire area of the composite page creates the sensation of a 3D image to a human observer. The image displayed is a duplicate of the 3D image which was present at the film plane in the camera which captured the original photograph. Projecting white light through the rear of the base element of the image display has the additional effect of canceling some of the multiplied intensity information. The resulting presentation appears very close to the actual light intensity level present when the photograph was captured by the camera.

While the theory of what produces the 3D effect of the present invention is not fully understood, the explanation found above is believed likely to be accurate. The following corollaries are also believed to be true:

Corollary 1

Encoded within every color photograph is holographic phase and intensity information which represents the 3D nature of the subject being photographed. It is believed that this holographic data is recorded within the pictorial elements of the photograph.

Corollary 2

Each time a photographic print is copied photographically, a small amount of the holographic phase and intensity data is lost. The best presentation of holographic phase and intensity information from a color photograph, when using the present invention, is obtained from the first generation color photographic print of a color print negative.

Corollary 3

The strength of the 3D effect in the image display with a spacing between elements of, for example, 0.005 inches is inversely proportional to the real size of the object photographed, that is, an image display of a color photomicrograph will yield a more pronounced 3D effect than will an image display created from a color photograph of a large subject.

Corollary 4

The strength of the 3D effect is directly related to the level of contrast and image sharpness in the original color photograph from which the image display was created.

Corollary 5

Increasing the spacing between the base element and cover element with additional spacing elements increases the strength of the 3D effect. However, little increase in the strength of the 3D effect is obtained with spacing beyond 0.070 inches.

Corollary 6

The 3D Effect does not operate with images which contain no holographic phase data. These images include the following broad types:
a. black and white photographs,
b. dot screen black and white or color images such as those in a magazine or newspaper,
c. perspective color or black and white line drawings,
d. printed continuous tone color images,
e. computer generated color images.

Corollary 7

Producing a image display according the invention from another such image display results in the deterioration of the 3D effect the second image display with a corresponding loss of image quality and resolution.

Corollary 8

Producing a composite base element and composite cover element from transparent four color overlays produces the same 3D effect as using a single translucent base element and transparent cover element.

Corollary 9

A image display made up of a composite four color transparent overlay base element and a single four color transparent cover element produces the same 3D effect as an image display made of a single four color translucent base element and a four color transparent cover element.

Corollary 10

An image display made up of a single translucent four color base element and a composite four color transparent overlay cover element produces the same 3D effect as an image display made of a single translucent four color base element and composite transparent four color cover element.

Corollary 11

The higher the resolution, expressed in DPI (Dots Per Inch), of the analog to digital color copying device used in the creation of an image display, the higher the image quality of that image display.

Corollary 12

The invention is effective with Polaroid™ color photographs with some slight reduction in the strength of the 3D effect in the resulting image display as compared to an image display produced from conventional color photographs of the same subject.

Corollary 13

Enlarging a color photograph with the analog to digital color copying device when creating the image display enlarges the 3D effect by a proportional amount.

Corollary 14

Producing an image display of a color photograph of an image display presents a magnified 3D effect in the second generation image display with a corresponding loss of image resolution.

Other objects, features and advantages of the present invention will be apparent upon reading the following detailed description of preferred embodiments of the invention, when taken in conjunction with the drawings and the appended claims.

BRIEF DESCRIPTION OF THE DRAWINGS

FIGS. 5A, 5B, and 5C show a fixture for assembling an image display according to the present invention in the three stages of assembly.

FIG. 6 is a pictorial view of a separator sheet prior to assembly in the fixture of FIG. 4.

DETAILED DESCRIPTION

Figure 1:
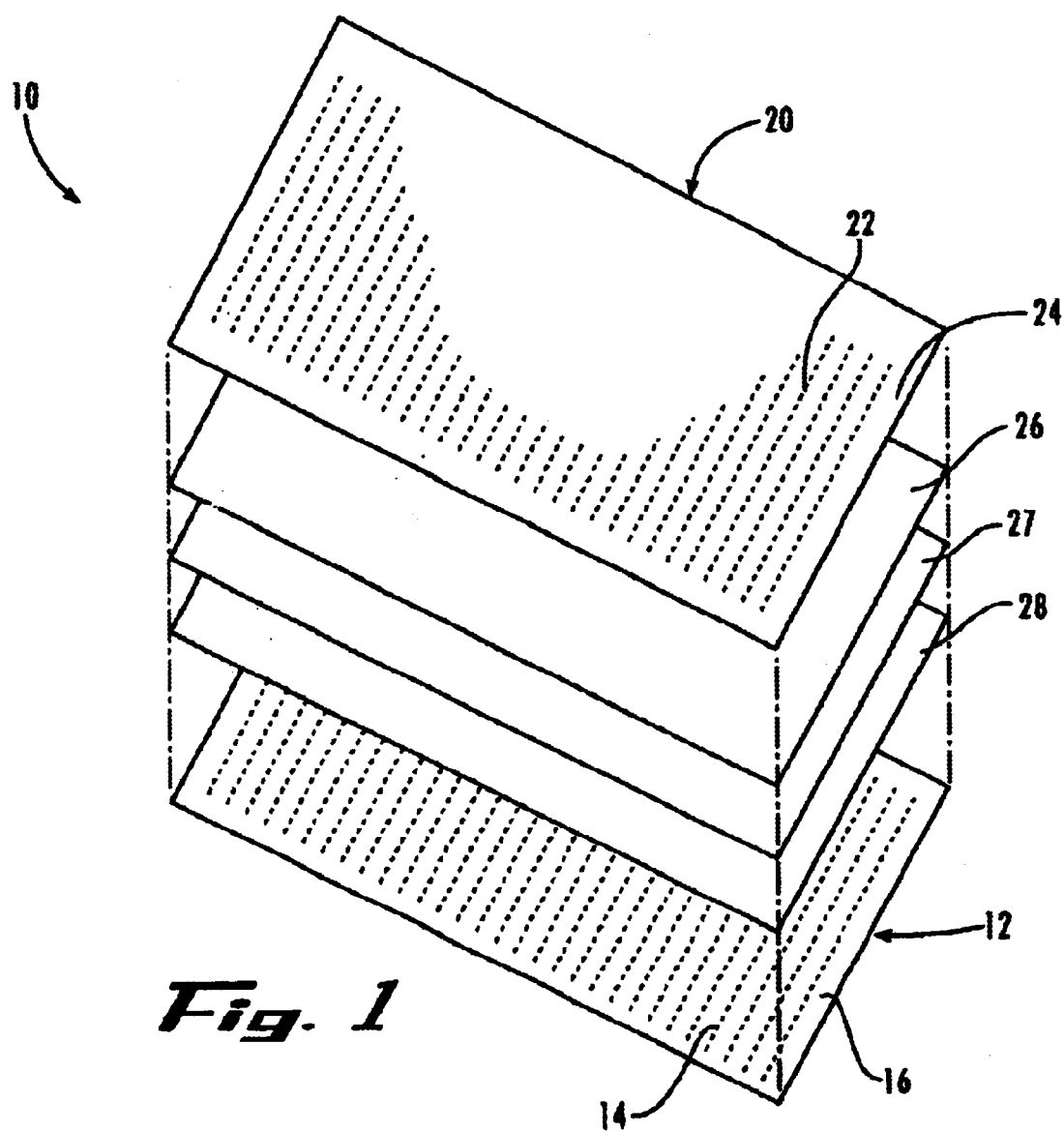
FIG. 1 shows an exploded pictorial view of a raster-pixel image display embodying the present invention.
Figure 2:
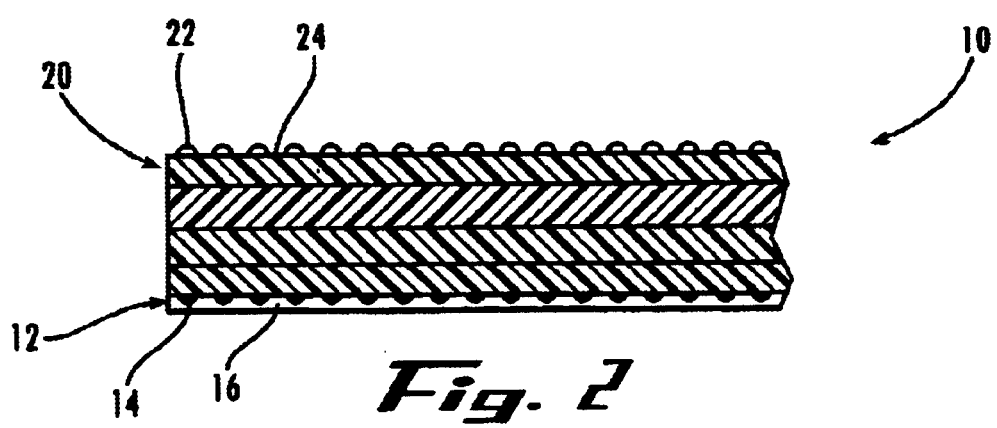
FIG. 2 is a cross-sectional view of the assembled image display of FIG. 1.

Referring now in more detail to the drawings, in which like numerals refer to like parts throughout the several views, FIGS. 1 and 2 show an image display 10 constructed according to the present invention to provide a three-dimensional effect. The image display 10 includes a base element 12, which is a raster-pixel representation 14 of a three-dimensional object or scene, recorded on a base medium 16. In the embodiment of FIGS. 1 and 2, the base medium 16 is a sheet of color photocopier paper, such as Champion Kromekote 2000 (which has thickness of about 0.010 inches), Hammerhill 28# color copier bond, or other translucent color photocopier paper. The raster-pixel representation 14 is printed on the base medium 16 by a color photocopier, such as a Lanier 5706, 5710 or 5806, or Canon 1150 photocopier.

When a color photographic print is the source material, the print must have multiple layers of emulsions to provide depth information in the raster-pixel representation 14. When an image file captured by a digital camera is the source material, the depth information is provided in the raster-pixel data of the image file. In this case, a color laser printer can be used, or a color photocopier having a digital signal input. Higher resolution (dots per inch/DPI) in a color photocopier or laser printer produces a better 3D effect.

The image display 10 also includes a cover element 20, which is a raster-pixel representation 22 of the same three-dimensional object or scene, recorded on a cover medium 24. In the preferred embodiment shown, the cover medium is a photocopier transparency, such as PP2500 Transparency Film by 3M, or some other transparent sheet on which images can be printed. The PP2500 film is made of polyester film and has a refractive index of about 1.64. As with the base medium, the raster-pixel representation 22 may be copied from a color photographic print on a color photocopier, or input from a digital camera.

A raster-pixel representation is an array or matrix of pixels. The pixels are arranged in rasters or rows, but they are not spaced regularly in columns. When the representation 14 is printed on the paper 16, toner applied by the photocopier or laser printer absorbs into the paper. Such pixels act as filters and diffract light passing through the paper 16. In contrast, toner applied to the transparency 24 is fixed as a droplet on the surface of the plastic. Such pixels act as tiny lenses and refract light passing through the cover 20. The interaction and interference of light beams differently affected by the base element 12 and the cover element 20 are believed to create a 3D effect in a manner analogous to a hologram, although the mechanism is not fully understood.

The base element 12 and the cover element 20 differ in the manner in which the pixels of the respective raster-pixel representations interact with light. In particular, they diffract and/or refract light differently. A further difference in the optical characteristics of the base element and the cover element arises from the base medium 16 and the cover medium 24 having different light transmission characteristics. Still further differences in such optical characteristics arise when different settings are used in a photocopier or color laser printer when creating each representation. Other ways for creating differences in optical characteristics may lead to a 3D effect.

The 3D effect is enhanced by separation between the raster-pixel representations. Some separation is provided by the thickness of the transparency 24. In the preferred embodiment, a series of separation elements or spacers 26, 27, and 28 are provided between the base element 12 and the cover element 20. The spacer 26 is a sheet of Lexan plastic, about 0.040 inch thick. Lexan (polycarbonate) has a refractive index of about 1.586. The spacers 27 and 28, positioned between the spacer 26 and the base element 12, are sheets of Mylar polyester film, 0.005 inch thick. Mylar (polyethylene terephthalate) has a refractive index of about 1.52. As explained below, a wide variety of spacer combinations or single sheet spacers can be used to accomplish the objective of the present invention. In the preferred embodiment, the arrangement of the spacers 26, 27, and 28 provides a high level of perceived 3D effect, good image detail resolution and brightness, and little double imaging, which can be a problem with some separator combinations. Generally, the preferred range for spacing of the base and cover elements is from about 0.03 to about 0.07 inch.

It should be understood that the techniques of the present invention can be used to enhance only a portion of the image. For example, when making the cover element 20, a white mask can be placed over portions of the photographic print that the user desires to have a two dimensional effect. The masked portions will remain clear, while the unmasked portions will accept toner as described above, and create a 3D effect for the portion of the image they overlay when the image display is assembled. In the case of a digital photograph, the user can edit the stored image with conventional software so as to print on the transparency only the area the user wishes to have a 3D effect.

Figure 3:
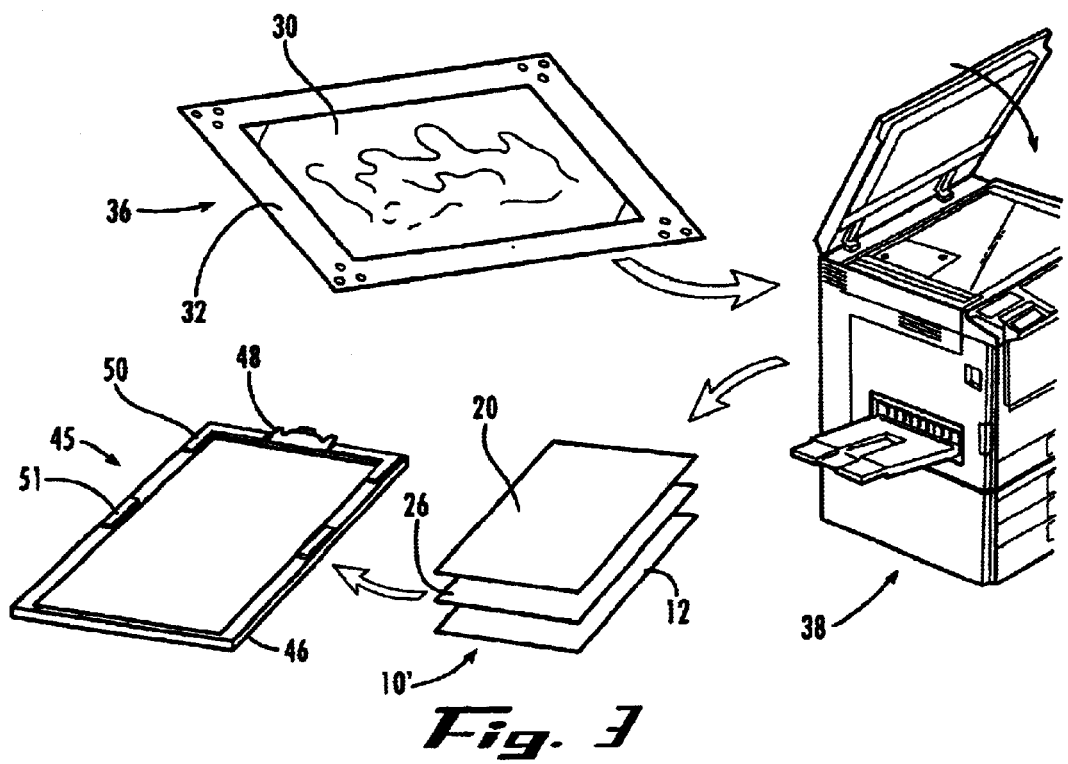
FIG. 3 is a diagram illustrating the sequence of steps for creating an image display from a photographic print.
Figure 4:
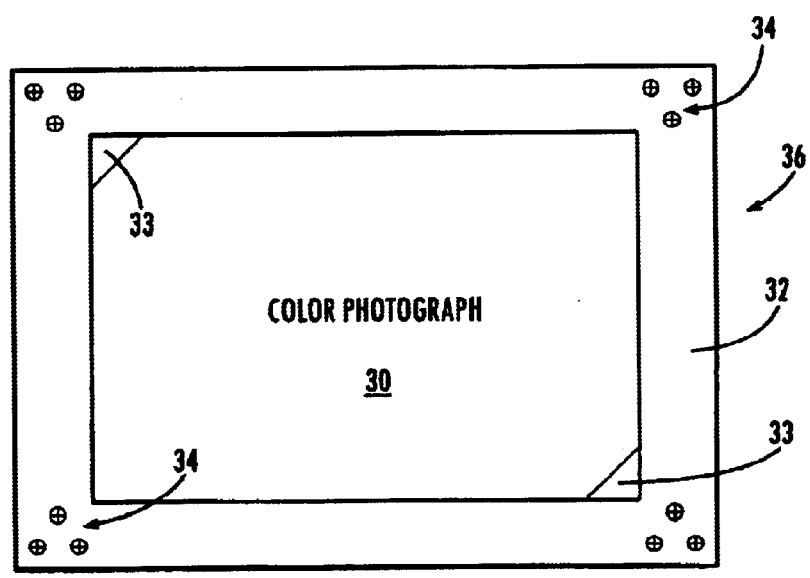
FIG. 4 is a pictorial view of a mount holding a color photographic print.

The basic steps for making the image display 10 from a photographic print and the elements described are diagrammatically illustrated in FIG. 3. First, a photographic print 30 is installed on a mount 32, to form a photograph assembly 36, best shown in FIG. 4. The mount 32, preferably a 4.5 inch by 6.5 inch sheet of heavy white card stock, has a pair of diagonally opposed photo corner pockets 33. The corner pockets 33 are carefully placed to fix the position of a standard size print 30 with two of its corners inserted into the pockets in the well known manner used to mount photos in photo albums. Alternatively, two slots may be cut in the mount 32 at the location of the entrance to the two photo pockets 33, and the corners of the print 30 may be inserted through the slots to fix the position of the print with respect to the mount 32. The mount 32 also includes two or more alignment marks 34 spaced apart on the periphery of the mount outside the footprint of the print 30. Preferably, the mount bears two or more sets of alignment marks, as shown, each of the sets having one or more marks. At a minimum, the mount should have some characteristic appearance that allows two reproductions of the mount to be aligned with one another. The characteristic could be a marking on the mount or a feature of the shape of the mount itself.

After the photograph assembly 36 is complete, it is placed on the glass of a color photocopier 38, which is set up according to the settings of one of the Examples below, preferably Example 16. A paper photocopy of the assembly 36 is made at the indicated settings. Then, another photocopy is made on transparency film at the indicated settings, which in Example 16 are the same as for the paper copy. The reproduction ratio of the photocopier should be adjusted so that the alignment marks are reproduced at the edge of the photocopies. Note that both of the photocopies show the alignment marks, which are in precisely the same relation to the image of the print 30 because the print is held in fixed relation to the mount 32. Thus, it is not critical that the photograph assembly remain stationary on the glass between the exposures.

Now the elements of the image display, shown unassembled as 10' in FIG. 3, are ready to be assembled into an image display 10 according to the present invention. This is accomplished using a fixture 45 shown in FIGS. 3 and 5. The fixture 45 includes a board 46 and a spring-loaded clip 48 at one edge of the board for holding down an edge of the base element 12, cover element 20, and desired separation elements (for example spacers 26, 27, 28) in the manner of a conventional clipboard. At the corners of the board 46 flanking the clip 48, L-shaped corner guides 50 are attached to the board. Side guides 51 may be attached along opposite sides of the board 46 that extend away from the corner guides 50, or a leg of the corner guides 50 may be extended along the side of the board. The corner guides 50 are placed to snugly receive an end of a standard size sheet of photocopier paper and corresponding transparency film. For example, the corners may be 8.5 inches apart, and the side guides 51 will then be separated by the same distance.

The steps of using the fixture 45 to assemble the image display 10 are shown in FIGS. 5A–5C. In FIG. 5A, the base element 12, which is the paper photocopy as described above, is placed on the fixture against the corner guides 50 and the side guides 51, and clipped in position with the clip 48 with the image side up. Next, the innermost transparent spacer sheet 28 is placed within the guides on the base element. Preferably, the spacers are provided with adhesive to hold all the elements together once they are properly aligned. As shown in FIG. 6, the innermost spacer sheet 28 may have a strip of pressure sensitive adhesive 54a applied along one edge of the inner (lower) surface of the sheet. The adhesive 54a may be protected by a protective cover or release paper 55a. An additional strip of pressure sensitive adhesive 54b may be applied to the outer (upper) surface along the same edge, and protected by release paper 55b. Thus, when the spacer 28 is aligned and clipped in the fixture, the free end is raised, the release paper 55a is removed, and the spacer is lowered and adhered to the base element 12.

Additional spacers 27 and 26 may then be placed in the fixture and clipped beneath the clip 48. The spacer above the previously installed spacer 28 may be adhered to the spacer 28 by removing the release paper 55b and lowering the new spacer onto the adhesive strip 54b. The additional spacers need only be provided with adhesive 54b and release paper 55b on their outer surfaces. After all the desired spacers are installed, the cover element 20 bearing the other photocopy is placed in the fixture with the image side up. The user views the alignment marks on both the cover element 20 and the base element 12 while lifting the clip 48, and aligns or indexes the marks on the respective photocopies as precisely as possible. Then the clip is engaged to hold the cover element in alignment while the free edge of the cover element opposite the clip is secured to the underlying spacer sheet by raising the cover element, removing the release paper 55b, and lowering the cover element onto the adhesive 54b. The image display 10 is now complete and can be removed from the fixture by raising the clip 48. If desired, the image display can be inserted into a protective transparent sleeve (not shown) made of thin plastic film.

Figure 7:
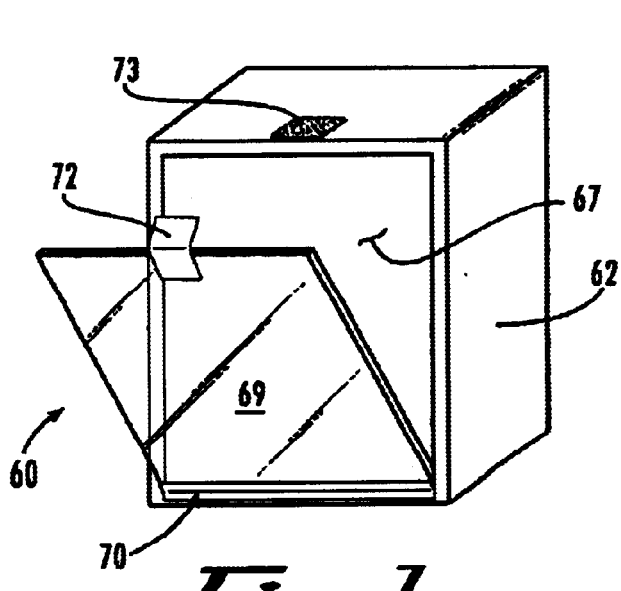
FIG. 7 is a pictorial view of a light box and holder for observing an image display according to the present invention.
Figure 8:
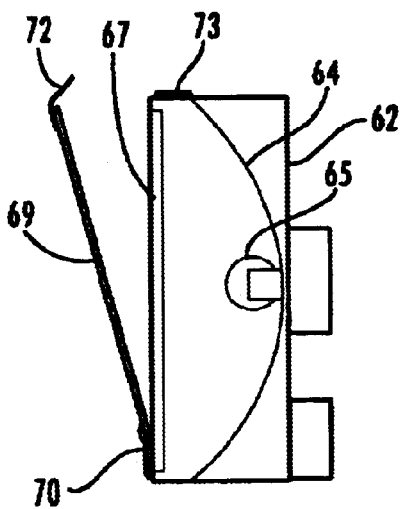
FIG. 8 is a side cross-sectional view, taken along line 8—8 of FIG. 7.

FIGS. 7 and 8 show a light box 60 that can be used to display the image display 10 with back-lighting. The light box 60 includes an open box frame 62 within which is mounted a white parabolic reflector 64. At the center of the reflector 64 a 5000° K color balanced fluorescent lamp 65 is positioned. A frosted panel 67, made of plastic or glass, encloses the open side of the frame 62. A transparent cover plate 69, preferably made of clear glass, is pivotally attached to the frame 62 along one edge by a hinge 70 that can be, for example, a flexible plastic hinge or any other type of hinge. Opposite the hinge 70, the cover may be secured to the frame by a latch having complementary parts 72 and 73 attached, respectively, to the cover 69 and to the frame 62. The latch may be formed of complementary Velcro tapes, by a strap bearing a snap, by a string and friction clasp, or any other appropriate latch.

The image display 10 is placed on the frosted panel 67 and the cover 69 is closed to hold the image display flat against the frosted panel 67. The lamp 65 illuminates the image display from the rear while ambient light, or a light source, illuminates the image display from outside the light box 60. The interaction of the front and rear light photons with the raster-pixel images and with each other produces the 3D effect in the manner described above.

Image displays embodying the present invention can be constructed from many different combinations of base, separation, and cover elements. Each of the elements can be composed of one or more individual sub-components. Several of these embodiments are described in the following examples, without limiting other possible combinations. In these examples, the machine settings for Exposure, Sharp/Soft, and Contrast refer to controls on the Lanier 5710, 5706, and 5806 Color Copiers. Other color copiers may have slightly different controls and thus require different settings to achieve the same results. The amount of enlargement of color photographic prints is not critical to the resulting 3D effect. The "RESULTS" are stated in terms of intensity perceived by an observer of the particular image display after a period of 120 seconds from a distance of 3 meters at an angle of 15° from vertical to the front surface of the image display, with front and rear illumination. The 3D Effect result is the perceived depth when viewing the image display as compared to the perceived depth (100%) in the actual photographed subject. The resolution is the perceived amount of detail captured by the image display as compared to the perceived detail (100%) in the actual photographed subject. The brightness is the perceived optical intensity of the image display as compared to the perceived optical intensity (100%) in the actual photographed subject. The double image characteristic is the perceived amount of double imaging in the image display when viewed under the same conditions except from an angle of 80° from the vertical to the image front surface. The minimum (0%) represents no double imaging, and the maximum (100%) represents an arbitrary level selected to allow comparison of the various image displays of the Examples. The perceived intensities noted in the Examples may vary from person to person.

Certain abbreviations are utilized in the Examples, namely, "KK2000" for Kodak Champion Kromekote 2000 Color Copier Paper, "PP2500" for 3M PP2500 Transparency Film, "VA" for vinyl acetate film (refractive index of about 1.56), "Plex" for Plexiglass sheet material (polymethyl methacrylate, refractive index of about 1.5), "Max." for maximum setting, "Mid." For mid-scale setting, and "Min." for minimum setting. Standard sheet glass has a refractive index of 1.517.

EXAMPLE 1

|  | Base Element | Separators | Cover Element |
|---|---|---|---|
| Material | KK2000 | .010" VA | PP2500 |
| Exposure | Mid. |  | Light |
| Sharp/Soft | Sharp |  | Soft |
| Contrast | Max. |  | Min. |

| RESULTS (Perceived Intensity) | |
|---|---|
| 3D Effect | 65% |
| Resolution | 53% |
| Brightness | 78% |
| Double Image | 8% |

EXAMPLE 2

|  | Base Element | Separators | Cover Element |
|---|---|---|---|
| Material | KK2000 | .010" VA | PP2500 |
| Exposure | Mid. |  | Mid. |
| Sharp/Soft | Sharp |  | Sharp |
| Contrast | Max. |  | Max. |

| RESULTS (Perceived Intensity) | |
|---|---|
| 3D Effect | 65% |
| Resolution | 68% |
| Brightness | 79% |
| Double Image | 8% |

EXAMPLE 3

|  | Base Element | Separators | Cover Element |
|---|---|---|---|
| Material | PP2500 over blank KK2000 | .010" VA | PP2500 |
| Exposure | Mid. |  | Mid. |
| Sharp/Soft | Sharp |  | Sharp |
| Contrast | Max. |  | Max. |

| RESULTS (Perceived Intensity) | |
|---|---|
| 3D Effect | 55% |
| Resolution | 50% |
| Brightness | 70% |
| Double Image | 8% |

EXAMPLE 4

|  | Base Element | Separators | Cover Element |
|---|---|---|---|
| Material | 2 images on 2 PP2500 sheets over blank KK2000 | .010" VA | 2 images on 2 PP2500 sheets |
| Exposure | Mid. |  | Light |
| Sharp/Soft | Sharp |  | Soft |
| Contrast | Max. |  | Max. |

| RESULTS (Perceived Intensity) | |
|---|---|
| 3D Effect | 68% |
| Resolution | 53% |
| Brightness | 63% |
| Double Image | 13% |

EXAMPLE 5

|  | Base Element | Separators | Cover Element |
|---|---|---|---|
| Material | 2 images on 2 PP2500 sheets over blank KK2000 | .010" VA | 2 images on 2 PP2500 sheets |

-continued

| Exposure | Mid. | | Mid. |
|---|---|---|---|
| Sharp/Soft | Sharp | | Sharp |
| Contrast | Max. | | Max. |

| RESULTS (Perceived Intensity) | |
|---|---|
| 3D Effect | 77% |
| Resolution | 68% |
| Brightness | 67% |
| Double Image | 8% |

EXAMPLE 6

| | Base Element | Separators | Cover Element |
|---|---|---|---|
| Material | KK2000 | .093" Plex. | PP2500 |
| Exposure | Mid. | | Light |
| Sharp/Soft | Sharp | | Soft |
| Contrast | Max. | | Min. |

| RESULTS (Perceived Intensity) | |
|---|---|
| 3D Effect | 92% |
| Resolution | 85% |
| Brightness | 88% |
| Double Image | 60% |

EXAMPLE 7

| | Base Element | Separators | Cover Element (outer) | Cover Element (inner) |
|---|---|---|---|---|
| Material | KK2000 | .010" VA | PP2500 | PP2500 |
| Exposure | Mid. | | Light | Mid. |
| Sharp/Soft | Sharp | | Soft | Sharp |
| Contrast | Max. | | Max. | Max. |

| RESULTS (Perceived Intensity) | |
|---|---|
| 3D Effect | 87% |
| Resolution | 90% |
| Brightness | 77% |
| Double Image | 35% |

EXAMPLE 8

| | Base Element | Separators | Cover Element |
|---|---|---|---|
| Material | 4 images on 4 PP2500 sheets over blank KK2000* | .010" VA | 4 images on 4 PP2500 sheets* |
| Exposure | Mid. | | Light |
| Sharp/Soft | Sharp | | Soft |
| Contrast | Max. | | Max. |

| RESULTS (Perceived Intensity) | |
|---|---|
| 3D Effect | 68% |
| Resolution | 53% |
| Brightness | 63% |
| Double Image | 13% |

*Each transparency is a single color separation (cyan, magenta, yellow, black)

EXAMPLE 9

| | Base Element | Separators | Cover Element |
|---|---|---|---|
| Material | KK2000 | .010" VA between 2.010" Mylar films | 2 images on PP2500 sep. by .005" Mylar |
| Exposure | Mid. | | Mid. |
| Sharp/Soft | Sharp | | Sharp |
| Contrast | Max. | | Max. |

| RESULTS (Perceived Intensity) | |
|---|---|
| 3D Effect | 50% |
| Resolution | 67% |
| Brightness | 73% |
| Double Image | 3% |

EXAMPLE 10

| | Base Element | Separators | Cover Element |
|---|---|---|---|
| Material | KK2000 | .040" Plex. betw. 2.005" Mylar films | PP2500 |
| Exposure | Mid. | | Mid. |
| Sharp/Soft | Sharp | | Sharp |
| Contrast | Max. | | Max. |

| RESULTS (Perceived Intensity) | |
|---|---|
| 3D Effect | 97% |
| Resolution | 72% |
| Brightness | 92% |
| Double Image | 20% |

EXAMPLE 11

| | Base Element | Separators | Cover Element |
|---|---|---|---|
| Material | KK2000 | .040" Plex. betw. 3 inner and 1 outer .005" Mylar films | PP2500 |
| Exposure | Mid. | | Light. |
| Sharp/Soft | Sharp | | Sharp |
| Contrast | Max. | | Max. |

| RESULTS (Perceived Intensity) | |
|---|---|
| 3D Effect | 93% |
| Resolution | 67% |
| Brightness | 73% |
| Double Image | 5% |

EXAMPLE 12

| | Base Element | Separators | Cover Element |
|---|---|---|---|
| Material | KK2000 | .040" Lexan inner + .030 Lexan outer | PP2500 |
| Exposure | Mid. | | Mid. |
| Sharp/Soft | Sharp | | Sharp |
| Contrast | Max. | | Max. |

EXAMPLE 13 -continued

RESULTS (Perceived Intensity)

| | |
|---|---|
| 3D Effect | 100% |
| Resolution | 93% |
| Brightness | 93% |
| Double Image | 25% |

EXAMPLE 13

| | Base Element | Separators | Cover Element |
|---|---|---|---|
| Material | KK2000 | .093" glass | PP2500 |
| Exposure | Mid. | | Mid. |
| Sharp/Soft | Sharp | | Sharp |
| Contrast | Max. | | Max. |

RESULTS (Perceived Intensity)

| | |
|---|---|
| 3D Effect | 42% |
| Resolution | 88% |
| Brightness | 75% |
| Double Image | 48% |

EXAMPLE 14

| | Base Element | Separators | Cover Element |
|---|---|---|---|
| Material | KK2000 | .040" Lexan | PP2500 |
| Exposure | Mid. | | Mid. |
| Sharp/Soft | Sharp | | Sharp |
| Contrast | Max. | | Max. |

RESULTS (Perceived Intensity)

| | |
|---|---|
| 3D Effect | 100% |
| Resolution | 95% |
| Brightness | 95% |
| Double Image | 43% |

EXAMPLE 15

| | Base Element | Separators | Cover Element |
|---|---|---|---|
| Material | KK2000 | .005" Mylar film betw. 2 .003" Lexan sheets | PP2500 |
| Exposure | Mid. | | Mid. |
| Sharp/Soft | Sharp | | Sharp |
| Contrast | Max. | | Max. |

RESULTS (Perceived Intensity)

| | |
|---|---|
| 3D Effect | 93% |
| Resolution | 93% |
| Brightness | 93% |
| Double Image | 18% |

EXAMPLE 16

| | Base Element | Separators | Cover Element |
|---|---|---|---|
| Material | KK2000 | 2 inner shts. .005" Mylar + .040 Lexan | PP2500 |
| Exposure | Mid. | | Mid. |
| Sharp/Soft | Sharp | | Sharp |
| Contrast | Max. | | Max. |

RESULTS (Perceived Intensity)

| | |
|---|---|
| 3D Effect | 100% |
| Resolution | 95% |
| Brightness | 95% |
| Double Image | 5% |

EXAMPLE 17

| | Base Element | Separators | Cover Element |
|---|---|---|---|
| Material | KK2000 | .040 Lexan + 2 outer .005 Mylar | PP2500 |
| Exposure | Mid. | | Mid. |
| Sharp/Soft | Sharp | | Sharp |
| Contrast | Max. | | Max. |

RESULTS (Perceived Intensity)

| | |
|---|---|
| 3D Effect | 100% |
| Resolution | 95% |
| Brightness | 95% |
| Double Image | 28% |

EXAMPLE 18

| | Base Element | Separators | Cover Element |
|---|---|---|---|
| Material | KK2000 | 1 inner sheet. .005" Mylar + .040 Lexan | PP2500 |
| Exposure | Mid. | | Mid. |
| Sharp/Soft | Sharp | | Sharp |
| Contrast | Max. | | Max. |

RESULTS (Perceived Intensity)

| | |
|---|---|
| 3D Effect | 100% |
| Resolution | 95% |
| Brightness | 95% |
| Double Image | 16% |

The configuration of Example 16 provides the best overall image display, with an excellent 3D effect and good suppression of double images. The use of inner Mylar film layers appears to be the best remedy for double imaging. For macro images, an additional outer 0.030 Lexan sheet could be added to improve the 3D results. However, double imaging will become a larger factor. Generally, Plexiglas has the disadvantage of being brittle, and having a tendency to crack and craze easily, leading to a loss of detail resolution. Vinyl acetate film tends to provide slightly better image brightness and detail resolution than Mylar. It is believed that results similar to these examples will be obtained using digital photographs.

Figure 9:
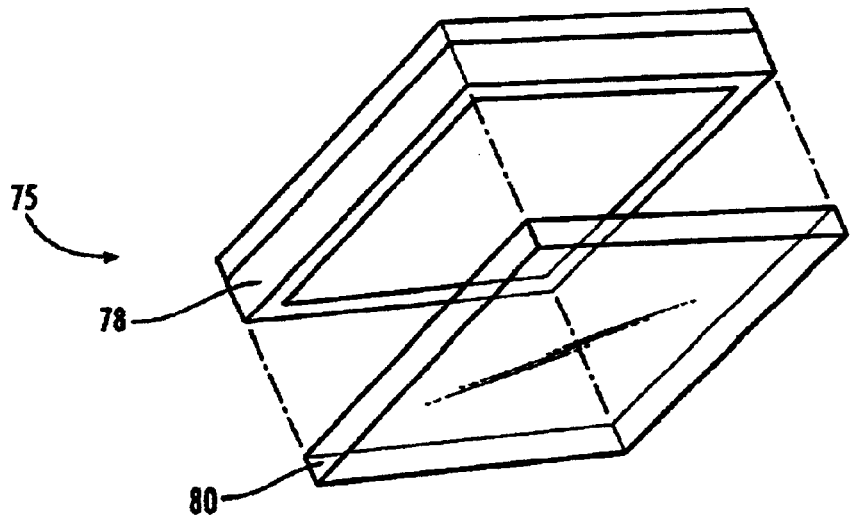
FIG. 9 shows an exploded view of a television display embodying the present invention.

FIG. 9 illustrates another embodiment of the present invention in which the basic principles of the invention are applied to a moving image. A 3D LCD image display device 75 includes an inner, back lit LCD panel 78 of the type used in television sets. A transparent outer LCD panel 80 of the same type has no backing or back lighting. Shown exploded away from the panel 78 in the drawing, the panel 80 in the assembled display device 75 is positioned parallel to and closely adjacent to the panel 78. The same image signal is connected to both LCD panels. When the two LCD panels are spaced apart by a distance from about 0.03 to about 0.07 inch, a 3D effect similar to that obtained by the image display 10 is observed in the moving images. However, there is less intensification of the 3D effect of the type that is observed over time in stationary image displays 10. The separation can be provided by the thickness of the LCD panels. The transparent nature of the outer LCD panel provides a difference in optical characteristic between the two moving images.

From the foregoing it will be seen that by superimposing color raster-pixel representations of the same field of view, the present invention provides an image display with a three-dimensional effect, prepared from a color analog or digital photograph, or from a digital display screen showing moving images. The product and method of the present invention for creating 3D effects are less complex than prior technologies and does not require the observer to use any special equipment, such as eyeglasses. The method for producing image displays according to the invention is straightforward, and has practical application to enhance conventional analog and digital photographs of amateur photographers. On the other hand, the invention can be used to enhance the appeal of commercial and artistic images. The moving image version has practical application in televisions and other motion picture displays.

While the invention has been described in detail with particular reference to exemplary embodiments thereof, it will be understood that modifications and variations can be made without departing from the scope of the invention as defined in the appended claims.

What is claimed is:

1. A positive image display, comprising:
   a first color raster-pixel representation of a three-dimensional field of view, including depth information, presented on a two-dimensional base medium;
   a second color raster-pixel representation of said tree-dimensional field of view, including depth information, presented on a two-dimensional transparent cover medium;
   said representations being held in spaced apart, aligned relation to one another; and
   a light source positioned behind said base medium.

2. The positive image display of claim 1, wherein said base medium comprises translucent paper.

3. The positive image display of claim 2, wherein said first and second representations comprise photocopies of a color photographic print.

4. The positive image display of claim 3, wherein said first and second representations are spaced apart between about 0.03 inch to about 0.07 inch.

5. The positive image display of claim 4, further comprising a transparent spacer between said representations.

6. The positive image display of claim 5, wherein said spacer comprises a layer of polycarbonate plastic and two layers of polyethylene terephthalate plastic.

7. The positive image display of claim 5, wherein said spacer comprises a layer of vinyl acetate.

8. The positive image display of claim 5, wherein said spacer comprises a layer of polycarbonate plastic.

9. The positive image display of claim 5, wherein said spacer comprises a layer of polyethylene terephthalate plastic.

10. The image positive display of claim 5, wherein said spacer comprises a layer of polymethyl methacrylate plastic.

11. The positive image display of claim 5, wherein said spacer comprises a layer of glass.

12. The positive image display of claim 2, wherein said first and second representations comprise laser printed digital color photographs.

13. The positive image display of claim 12, wherein said first and second representations are spaced apart between about 0.03 inch to about 0.07 inch.

14. The positive image display of claim 13, further comprising a transparent spacer between said representations.

15. The positive image display of claim 14, wherein said spacer comprises a layer of polycarbonate plastic and two layers of polyethylene terephthalate plastic.

16. A method of displaying the positive image display of claim 2, comprising:
    illuminating said base medium to pass light through said translucent paper base medium and through said transparent cover medium; and, at the same time,
    illuminating said transparent cover medium.

17. The positive image display of claim 1, wherein the representations are spaced apart by one or more plastic sheets, each of said sheets including a strip of adhesive along an edge thereof positioned to adhere the plastic sheets to one another and to said first and second raster-pixel representations.

18. The positive image display of claim 1, wherein said representations differ in the manner in which the pixels of the respective representations interact with light.

19. The positive image display of claim 1, wherein said representations differ in the manner in which the pixels of the respective representations diffract and/or refract light.

20. The positive image display of claim 1, wherein said base medium and said cover medium have different light transmission characteristics.

21. The positive image display of claim 1, wherein said base medium comprises a back-lit first LCD color display and said cover medium comprises a second LCD color display.

22. A method of preparing positive image display, comprising:
    inputting to a laser printing device a color image including depth information;
    printing a first raster-pixel representation of the color image on a base medium;
    printing a second raster-pixel representation of the color image on a transparent cover medium;
    aligning said representations and mounting them in spaced apart relation; and
    back-lighting the base medium.

23. The positive image display of claim 22, wherein said base medium comprises translucent paper.

24. The method of claim 23, further comprising:
    illuminating said base medium to pass light through said translucent paper base medium and through said transparent cover medium; and, at the same time, illuminating said transparent cover medium.

25. The method of claim 23, wherein said first and second representations comprise photocopies of a color photographic print.

26. The method of claim 23, wherein said first and second representations are spaced apart between about 0.03 inch to about 0.07 inch.

27. The method of claim 26, further comprising a transparent spacer between said representations.

28. The method of claim 27, wherein said spacer comprises a layer of Lexan plastic and two layers of Mylar plastic.

29. The method of claim 23, wherein said first and second representations comprise laser printed digital color photographs.

30. The method of claim 29, wherein said first and second representations are spaced apart between about 0.03 inch to about 0.07 inch.

31. The method of claim 30, further comprising a transparent spacer between said representations.

32. The method of claim 31, wherein said spacer comprises a layer of polycarbonate plastic and two layers of polyethylene terephthalate plastic.

33. The method of claim 32, wherein the step of printing the first raster-pixel representation of the color image on a base medium comprises making a paper color photocopy of a color photographic print at one set of exposure setting of a photocopier; and the step of printing the second raster-pixel representation of the color image on a transparent cover medium comprises making a color transparency of the color photographic print at a lighter exposure setting.

34. The method of claim 32, wherein said inputting step comprises mounting a color photographic print in a frame including registration indicia, such that the registration indicia appear on both of said representations; and wherein said aligning step comprises aligning the registration indicia.

35. A directly viewable positive image display, comprising:
- a first color raster-pixel refractive representation of a three-dimensional field of view, including depth information, presented on a two-dimensional base medium; and
- a second color raster-pixel reflective representation of said three-dimensional field of view, including depth information, presented on a two-dimensional transparent cover medium;
- said representations being held in spaced apart, aligned relation to one another.

36. The directly viewable positive image display of claim 35, further comprising a light source positioned behind said base medium.

37. The positive image display of claim 1, wherein said light source comprises about 5000 degrees K.

38. The directly viewable positive image display of claim 36, wherein said light source comprises about 5000 degrees K.

* * * * *